Figure 1:
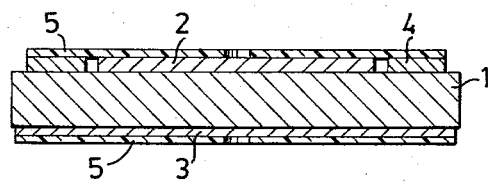

United States Patent

Westerberg

[11] 4,181,854
[45] Jan. 1, 1980

[54] METHOD FOR READING THE RADIATION DOSE RECEIVED BY A TSC DOSIMETER

[75] Inventor: Stefan Westerberg, Nyköping, Sweden

[73] Assignee: AB Atomenergi, Nyköping, Sweden

[21] Appl. No.: 876,557

[22] Filed: Feb. 9, 1978

[30] Foreign Application Priority Data

Feb. 11, 1977 [SE] Sweden .............................. 7701560

[51] Int. Cl.$^2$ .............................................. G01T 1/00
[52] U.S. Cl. ...................................... 250/336; 250/337
[58] Field of Search ......................... 250/336, 337, 395

[56] References Cited
U.S. PATENT DOCUMENTS 4,016,422  4/1977  Moran et al. .................... 250/337 X Primary Examiner—Davis L. Willis
Attorney, Agent, or Firm—Haseltine, Lake & Waters

[57] ABSTRACT

In a method for determining the radiation received in the past by a TSC dosimeter, the dosimeter is connected to a voltage source providing a polarizing voltage across the dosimeter and to an external closed electric circuit. The initial current pulse then flowing through the dosimeter due to its capacitive properties is detected and measured and if its peak value lies within a predetermined range the actual reading-off of the radiation dose received by the dosimeter is started in that a heating of the dosimeter is initiated and the thermally stimulated currents then produced by the dosimeter in the external closed electric circuit are measured and recorded.

3 Claims, 3 Drawing Figures

METHOD FOR READING THE RADIATION DOSE RECEIVED BY A TSC DOSIMETER

This invention relates to dosimetry based on TSC and concerns in particular a method for determining or reading-off the radiation dose previously received by a TSC dosimeter.

It is known that some dielectric materials, as e.g. $Al_2O_3$, display quite specific properties when exposed to high energy ionizing radiation. When such a material is exposed to radiation, electrons in the material are excited from their valence or ground level up into the conduction band. Most of these electrons will return rapidly to their ground states, but some of them will become trapped in so called electron traps, in which the trapped electrons will remain so long as the material is maintained at room temperature. The number of such trapped electrons in the material may be substantially proportional to the total radiation dose received by the material. If the irradiated material is subsequently heated, most of the trapped electrons will be released and their recombination with their ground states may result in an emission of thermally stimulated luminescence which can be used for determining the radiation dose previously received by the material. This phenomenon has been used for thermoluminescent dosimetry (TLD). It is also know that if such an irradiated material is disposed between two electrodes, which during the heating of the material are connected to a voltage source providing a polarizing electric field within the material, the trapped electrons in the material, which are released due to the heating of the material, will produce a thermally stimulated current (TSC) between the electrodes. This current can be measured by means of a suitable current meter in a closed external circuit connected between the electrodes and the integrate value of this current will be a measure upon the radiation dose previously received by the material.

The TSC effect has been described for instance in the article "Thermally Stimulated Current in Tissue-equivalent Materials for Radiation Dosimetry" in Phys. Med. Biol. 1973, Vol. 18, No. 3, pages 409–420, and it has been suggested by the authors of said article and also by others that the TSC effect should be used for radiation dosimetry. A TSC dosimeter consists of a small wafer or disc, for instance having the general shape and size of a small coin or button, of a suitable material displaying the TSC effect. The opposed major surfaces of this wafer or disc are coated with electrically conducting layers, for instance of aluminium, serving as contact electrodes for the dosimeter. It may be preferable that at least one of these contact electrodes of the dosimeter wafer is surrounded by an annular guard-electrode.

Such dosimeters may for instance be carried by persons having such work that they may be exposed to harmful radiation. In order to make a regular check of the radiation to which the individual persons may have been exposed, their dosimeters have to be exchanged at regular intervals and subjected to a process for determining or reading-off the radiation dose which the dosimeters may have received.

As described in the foregoing, the reading-off of a dosimeter requires that the electrodes of the dosimeter are connected to an external closed electric circuit comprising means for measuring the current flowing through the circuit and in most cases also to the terminals of a voltage source providing a polarizing voltage across the dosimeter and that the dosimeter is heated in a controlled manner so that the trapped electrodes in the dosimeter material, which are a result of the previous irradiation of the dosimeter, are released and can produce the thermally stimulated current which can be used as a measure upon the radiation dose previously received by the dosimeter. It will be appreciated that a dosimeter can be read-off only once, as the trapped electrons in the dosimeter material, which constitute a stored information on the radiation previously received by the dosimeter, are released when the dosimeter is heated. If any mistakes or errors are made when reading-off an irradiated dosimeter so that no correct result is obtained, it will consequently not be possible to repeat the reading process, as the heating of the dosimeter has already released all trapped electrons and consequently erased the information stored in the dosimeter. This means, of course, that the reading-off of the dosimeters must be performed in a very careful and fail-safe manner so that the information stored in the dosimeters is not irrevocably destroyed before it has been read-off in a correct manner.

Therefore, it would be very advantageous if it were possible, before initiating the heating of the dosimeter, to test the correct operation of the apparatus used for reading the dosimeter. In particular, one would like to test the connections between the electrodes of the dosimeter and the terminals of the external circuit comprising the polarizing voltage source and the current measuring means. Further, one would like to check that said current measuring means are operating in a satisfactory manner and that the polarizing voltage has a sufficient value. However, the prior art does not teach any simple and reliable method of performing such checks before initiating the heating of the dosimeter and the recording of the thermally stimulated currents produced by the heated dosimeter.

The present invention provides such a method. The method according to the invention is based on the fact that a TSC dosimeter consists of a dielectric material disposed between two opposed electrodes, wherefore the dosimeter in some respects functions as a capacitor and has an electric capacitance. Consequently, when a dosimeter is connected, through its electrodes, to the external polarizing voltage source and to the external closed electric circuit and the current measuring means in the dosimeter reader, a capacitive current pulse will immediately flow through said external electric circuit, even if the dosimeter has not previously received any radiation dose and even before any heating of the dosimeter has been started. According to the present invention this initial capacitive current pulse is detected by means of the current measuring means in the external electric circuit connected to the dosimeter and if the pick value of this initial current pulse lies within a predetermined range, this is taken as a criterion of satisfactory electric connections between the dosimeter and the measuring apparatus, of a sufficient polarizing voltage and of correct operation of the current measuring means, wherefore the heating of the dosimeter and the measuring and recording of the thermally stimulated currents produced in the heated dosimeter can be initiated.

Another problem encountered when reading-off a dosimeter concerns the sensitivity of the dosimeter. It will be appreciated that in order to determine the absolute value of the radiation dose received in the past by the dosimeter, it is necessary to know the sensitivity of the actual dosimeter, i.e. the ratio between a given radiation dose and the value of the corresponding thermally stimulated currents produced by the dosimeter when inserted and heated in the dosimeter reader. According to the prior art, the only method of determining the sensitivity of a dosimeter has been to expose the dosimeter to a predetermined known radiation dose and subsequently insert the dosimeter in the reader and measure the currents produced by the heated dosimeter. However, it has now been found by the inventor that the initial capacitive current pulse produced by a dosimeter, when it is connected to the polarizing voltage source and to the current measuring circuit of the dosimeter reader, is in fact related to the sensitivity of the dosimeter in such a manner that the magnitude of this initial capacitive current pulse can be used as a reference value for the sensitivity of the dosimeter. Consequently, by measuring the initial capacitive current pulse from the dosimeter one can obtain the necessary information about the sensitivity of the dosimeter. In this way it will no longer be necessary to perform any comparing measurements on the dosimeter after it has been exposed to a predetermined known radiation dose.

Figure 2:
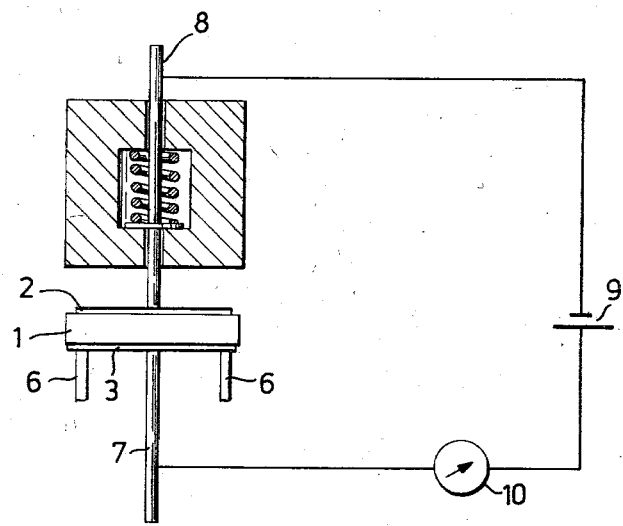
Figure 3:
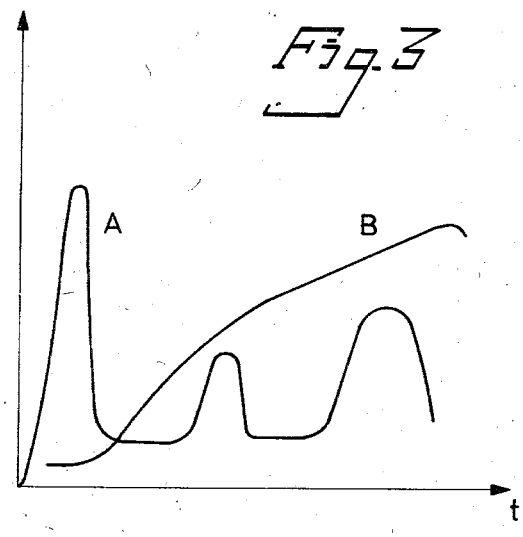

It has also been found by the inventor that the Q-value of a dosimeter is a characteristic value which is related to the minimum radiation dose that can be recorded by the aid of the dosimeter, and that this Q-value of the dosimeter can be used for calibrating the dosimeter reader so that it can be made to give the measurement results directly in units of radiation dose. In the following the invention will be described in further details with reference to the accompanying drawings, in which FIG. 1 is a side view in section of a TSC dosimeter shown by way of example;

FIG. 2 shows schematically and by way of example parts of a dosimeter reader used for determining or reading off the radiation dose received by a dosimeter; and FIG. 3 is a diagram in which curve A illustrates the currents from the dosimeter and curve B illustrates the temperature of the dosimeter as a function of time, when the dosimeter is inserted in a dosimeter reader of the type shown in FIG. 2 in order to determine the radiation dose previously received by the dosimeter. FIG. 1 shows by way of example a side view in section of a TSC dosimeter at an enlarged scale. The dosimeter consists of a circular wafer or disc 1 of a dielectric material with TSC effect, as for instance $Al_2O_3$. Both major surfaces of this disc 1 are coated with thin contact electrodes 2 and 3, respectively, consisting of a suitable electrically conducting material, as for instance aluminium when the disc 1 consists of alumina. The electrodes may be provided with a gold coating. One electrode 2 may be surrounded by an annular guard-electrode 4, the purpose of which is to control the polarizing electric field across the dosimeter and to collect creepage currents during the reading-off of the dosimeter. In order to make it possible to read-off the dosimeter without any disturbing influence from ionization currents in the surrounding air, all exposed electrode surfaces may be provided with an insulation layer 5. These insulation layers give also the advantage that the dosimeter can be handled without any risk of affecting or destroying the measuring results obtained when the dosimeter is inserted in a dosimeter reader, as described in the following.

When a dosimeter has been exposed to radiation and the amount of radiation, i.e. the radiation dose, received by the dosimeter shall be determined, the dosimeter is connected to a dosimeter reader of the general type shown schematically in FIG. 2. In this dosimeter reader the dosimeter 1 is inserted between a fixed support member 6 and an electric contact pin 7, on the one side of the dosimeter, and a spring biased contact pin 8, on the opposite side of the dosimeter. The contact pins 7 and 8 will be in electric contact with the electrodes 3 and 2, respectively, of the dosimeter 1. If the dosimeter electrodes 2 and 3 are provided with insulation layers 5, as shown in FIG. 1, these insulation layers are of course provided with openings for the contact pins 7 and 8. The contact pins 7 and 8 serve as terminals for an external electric circuit which includes a voltage source 9 providing a polarizing voltage, for instance of about 500 volt, for the dosimeter and a suitable current measuring device or instrument 10. As explained in the foregoing, the dosimeter reader will also comprise means, not shown in the drawings, for heating the dosimeter 1 in order to release the trapped electrons therein and produce the thermally stimulated currents, which can be used as a measure upon the radiation dose received by the dosimeter in the past.

When the dosimeter 1 is inserted between the contact pins 7 and 8 in the dosimeter reader and the electric circuit connected to these contact pins is closed, the capacitive properties of the dosimeter will give course to an initial capacitive current pulse, through the circuit, as has been explained in the foregoing. This initial capacitive current pulse is illustrated by the first peak of the curve A in the diagram in FIG. 3. According to the invention this initial capacitive current pulse is measured by means of the current measuring instrument 10 and if the peak value of this current pulse lies within a predetermined range, this can be taken to prove that the electrical connections between the dosimeter and the contact pins 7 and 8 are satisfactory, that the polarizing voltage from the voltage source 9 is sufficient and that the current measuring device 10 is functioning in its proper manner. Therefore, the actual read-off of the dosimeter can be started in that the heating of the dosimeter is initiated and the thermally stimulated currents then produced by the dosimeter are measured and recorded. In the curve A in the diagram in FIG. 3, these thermally stimulated currents are illustrated as two additional current peaks which occur at different temperature ranges when the dosimeter is heated.

As mentioned in the foregoing, the magnitude of the initial capacitive current pulse from the dosimeter may also be used as a reference value for determining the sensitivity of the dosimeter. Further, the Q-value of the dosimeter may be determined and used for calibrating the dosimeter reader, i.e. the polarizing voltage from the voltage source 9 and the current measuring device 10, so that the readings from the dosimeter reader are obtained directly in units of radiation.

I claim:

1. A method for determining the radiation dose received by a TSC dosimeter, which comprises a dosimeter body of a dielectric material having two opposed major surfaces at least partially covered by one contact electrode each, said method comprising the steps of connecting the dosimeter through its said contact electrodes to the terminals of an external source of polarizing voltage and to an external closed electric circuit, detecting the initial current pulse then flowing through the dosimeter due to its capacitive properties, determining whether the peak value of said initial capacitive current pulse lies within a predetermined range, initiating a heating of the dosimeter and a measuring and recording of the thermally stimulated currents produced by the heated dosimeter through said external closed electric circuit.

2. A method as claimed in claim 1, comprising the additional steps of measuring said initial capacitive current pulse and using the value thereof for determining the sensitivity of the dosimeter.

3. A method as claimed in claim 2, comprising the additional steps of determining the Q-value of the dosimeter and calibrating means used for measuring and recording said thermally stimulated currents in relation to said Q-value.

* * * * *